(No Model.)
L. H. MILLER.
SPOKE SOCKET.
No. 425,141. Patented Apr. 8, 1890.
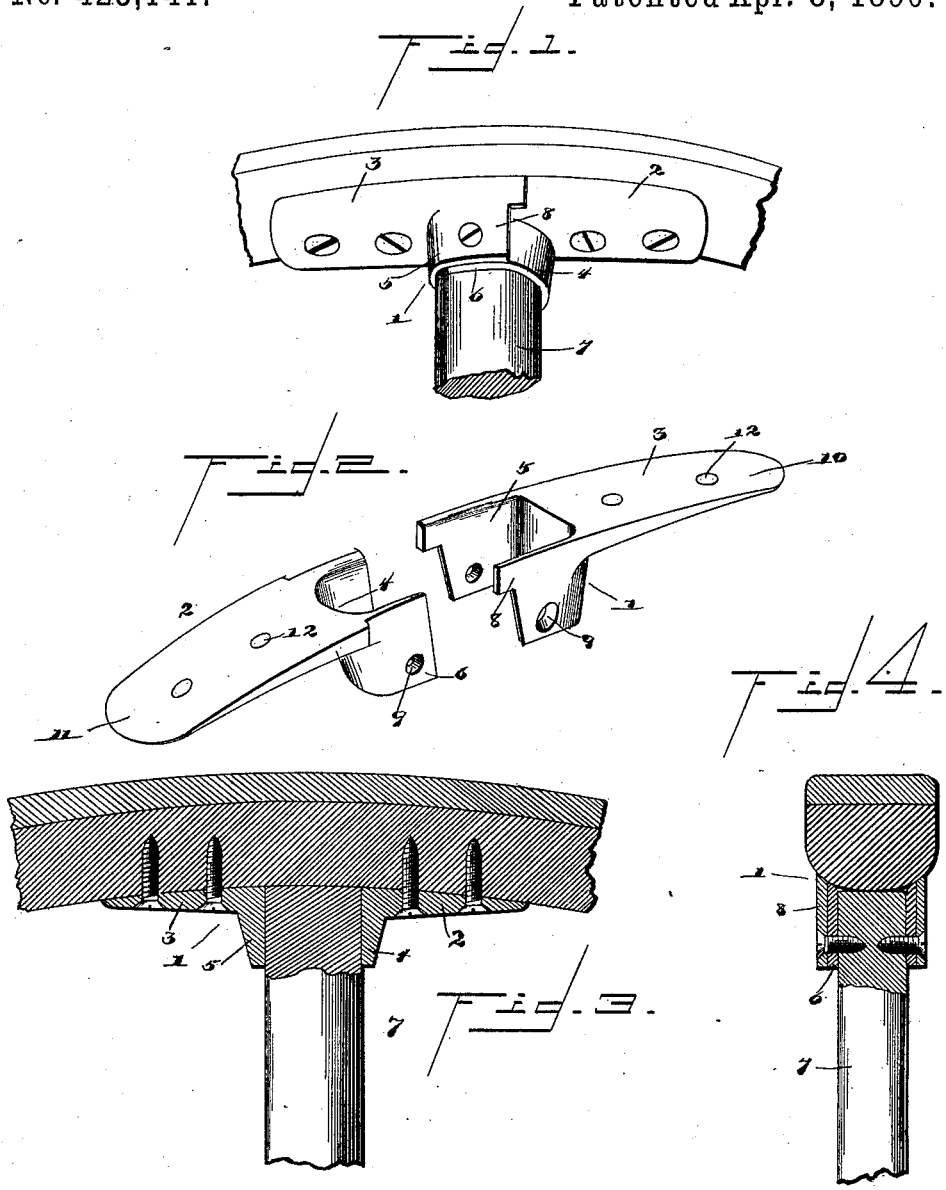
Witnesses
Samuel Ket.
H. T. Riley
Inventor
Levi H. Miller.
By his Attorneys,
C. A. Snow & Co.

UNITED STATES PATENT OFFICE.

LEVI H. MILLER, OF WILMINGTON, DELAWARE.

SPOKE-SOCKET.

SPECIFICATION forming part of Letters Patent No. 425,141, dated April 8, 1890.

Application filed February 15, 1890. Serial No. 340,539. (No model.)

*To all whom it may concern:*

Be it known that I, LEVI H. MILLER, a citizen of the United States, residing at Wilmington, in the county of New Castle and State of Delaware, have invented a new and useful Spoke-Socket, of which the following is a specification.

The invention relates to improvements in spoke-sockets.

The object of the present invention is to provide a simple and inexpensive spoke-socket adapted to be readily secured to a spoke and the felly and enable the former to be quickly replaced in case of injury without separating the parts of the wheel.

A further object of the invention is to provide a spoke-socket that will brace a spoke and the felly and enable them to be used with safety after being slightly broken or injured.

The invention consists in the construction and novel combination and arrangement of parts hereinafter described, illustrated in the accompanying drawings, and pointed out in the claims hereto appended.

In the drawings, Figure 1 is a perspective view of a spoke-socket constructed in accordance with the invention and shown applied to a spoke and felly. Fig. 2 is a perspective view of the spoke-socket detached, the sections being slightly separated. Fig. 3 is a longitudinal sectional view, the parts being in position shown in Fig. 1. Fig. 4 is a transverse sectional view of the same.

Referring to the accompanying drawings, 1 designates a spoke-socket, which is constructed of suitable metal and is composed of sections 2 and 3. The sections 2 and 3 are provided with socket portions 4 and 5, that are adapted to fit around the end of a spoke and securely clamp the same. The sides 6 of the socket 4 fit closely against the end of the spoke 7, and the sides 8 of the socket portion 5 of the other section are slightly larger than the sides 6 and lap over the latter, and the said sides 6 and 8 are provided with openings or perforations 9, that register with each other and are adapted to receive screws, rivets, or the like, that pass through the end of the spoke and secure the sections of the socket thereon. The sections 2 and 3 of the spoke-socket are provided with curved flanges or plates 10 and 11, which conform to the configuration of a felly and are secured thereto by screws, bolts, or the like, that pass through perforations 12 of the plates or flanges.

In applying the spoke-socket the sections are first secured to the end of the spoke by rivets, screws, or the like, which pivot the sections to the spoke, and the plates or flanges 10 and 11 are then secured to the felly. By securing the plates and flanges in place the sections are drawn together, thereby securely clamping the end of the spoke, and it will readily be seen that the clamping action of the sections can be regulated.

From the foregoing it will be obvious that spoke-sockets constructed in accordance with this invention are simple and comparatively inexpensive, adapted to be readily applied in position, and capable of securely clamping the end of a spoke and of enabling the latter when injured to be removed and replaced by a new spoke without necessitating the separation of the parts of the wheel.

What I claim is—

1. A spoke-socket composed of sections provided with socket portions 4 and 5, lapping each other and having registering perforations, and adapted to be pivoted together and to the end of a spoke and clamp the latter, substantially as and for the purpose described.

2. A spoke-socket consisting of similar sections having curved plates or flanges adapted to be secured to the felly and provided with socket portions 4 and 5, lapping each other and having registering perforations, and adapted to be pivoted together and to the end of a spoke to clamp the latter, substantially as described.

In testimony that I claim the foregoing as my own I have hereto affixed my signature in presence of two witnesses.

LEVI H. MILLER.

Witnesses:
E. D. R. SUTTON,
HENRY J. CRIPPEN.